(12) United States Patent
Ogrin et al.

(10) Patent No.: US 8,225,704 B2
(45) Date of Patent: Jul. 24, 2012

(54) ARMOR WITH TRANSFORMED NANOTUBE MATERIAL

(75) Inventors: Douglas Charles Ogrin, Alvin, TX (US); Kyle Ryan Kissell, Manvel, TX (US); Kurt Lee Lundberg, Kingwood, TX (US); John Richard Tidrow, Houston, TX (US)

(73) Assignee: Nanoridge Materials, Inc., Houston, TX (US)

( * ) Notice: Subject to any disclaimer, the term of this patent is extended or adjusted under 35 U.S.C. 154(b) by 80 days.

(21) Appl. No.: 12/657,289

(22) Filed: Jan. 16, 2010

(65) Prior Publication Data

US 2011/0174145 A1  Jul. 21, 2011

(51) Int. Cl.
F41H 5/04 (2006.01)
C04B 35/645 (2006.01)
B28B 5/00 (2006.01)
B32B 18/00 (2006.01)
B82Y 99/00 (2011.01)

(52) U.S. Cl. ......... 89/36.02; 89/908; 156/245; 264/641; 428/911; 977/902

(58) Field of Classification Search .................. 89/36.02; 156/245; 264/641; 428/911; 977/902
See application file for complete search history.

(56) References Cited

U.S. PATENT DOCUMENTS

| | | | |
|---|---|---|---|
| 4,969,386 A | 11/1990 | Sandstrom et al. | 89/36.02 |
| 5,175,040 A | 12/1992 | Harpell et al. | 428/113 |
| 5,221,807 A | 6/1993 | Vives | 89/36.02 |
| 5,517,894 A | 5/1996 | Bohne et al. | 89/36.02 |
| 5,824,940 A | 10/1998 | Chediak et al. | 89/36.02 |
| 5,996,115 A | 12/1999 | Mazelsky | 2/2.5 |
| 6,568,310 B2 | 5/2003 | Morgan | 89/36.02 |
| 6,745,662 B2 | 6/2004 | Ford | 89/36.02 |
| 6,826,996 B2 | 12/2004 | Strait | 89/36.02 |
| 6,911,260 B2 | 6/2005 | Ren et al. | 428/408 |
| 7,015,142 B2 | 3/2006 | DeHeer et al. | 438/689 |
| 7,041,372 B2 | 5/2006 | Rhoads et al. | 428/408 |
| 7,105,596 B2 | 9/2006 | Smalley et al. | 524/495 |
| 7,396,494 B1 | 7/2008 | Sueoka et al. | 264/29.2 |
| 7,481,267 B2 | 1/2009 | Zhan et al. | 165/185 |
| 7,510,762 B1 | 3/2009 | Sueoka et al. | 428/292.1 |
| 7,513,186 B2 | 4/2009 | Ravid et al. | 89/36.02 |
| 7,550,129 B2 | 6/2009 | Baker et al. | 423/447.2 |
| 7,581,645 B2 | 9/2009 | Ho et al. | 209/3.1 |
| 7,601,416 B2 | 10/2009 | Palley | 428/171 |
| 7,682,654 B2 | 3/2010 | Cooper et al. | 427/201 |
| 7,682,694 B1 | 3/2010 | Gintz et al. | 428/364 |

(Continued)

FOREIGN PATENT DOCUMENTS

WO  WO 2008/140623  12/2007

OTHER PUBLICATIONS

Improved Performance of Alumina Ceramics With Carbon Nanotube Reinforcement; Ceramic Armor Materials by Design; 2001; pp. 551-556.

(Continued)

*Primary Examiner* — Bret Hayes (74) *Attorney, Agent, or Firm* — Guy McClung (57) ABSTRACT

Armor with ceramic material and transformed nanotube material produced during/via process transformation, the transformed material in one aspect being graphene ribbon-like material; in one be used to interpret or limit the scope or meaning of the claims, 37 C.F.R. 1.72(b).

5 Claims, 8 Drawing Sheets

U.S. PATENT DOCUMENTS

| | | | |
|---|---|---|---|
| 7,743,835 B2 | 6/2010 | Willauer | 166/387 |
| 7,815,806 B2 | 10/2010 | Cooper et al. | 210/660 |
| 7,829,622 B2 | 11/2010 | McDaniel et al. | 524/496 |
| 7,834,139 B2 | 11/2010 | Matsui et al. | 530/300 |
| 7,837,905 B2 | 11/2010 | Barker et al. | 264/29.2 |
| 7,838,459 B2 | 11/2010 | Nagy et al. | 502/300 |
| 7,838,587 B2 | 11/2010 | El Bounia et al. | 524/495 |
| 7,871,533 B1 | 1/2011 | Haiping et al. | 252/70 |
| 2003/0170166 A1* | 9/2003 | Smalley et al. | 423/447.1 |
| 2004/0020353 A1* | 2/2004 | Ravid et al. | 89/36.02 |
| 2004/0029706 A1 | 2/2004 | Barrera et al. | 501/99 |
| 2004/0217520 A1* | 11/2004 | Hong et al. | 264/442 |
| 2004/0247808 A1 | 12/2004 | Cooper et al. | 428/36.1 |
| 2005/0158551 A1 | 7/2005 | Rhoads et al. | 428/36.1 |
| 2006/0029537 A1 | 2/2006 | Zhang et al. | 423/447.1 |
| 2006/0057050 A1* | 3/2006 | Ren et al. | 423/291 |
| 2006/0062944 A1* | 3/2006 | Gardner et al. | 428/34.1 |
| 2006/0062985 A1 | 3/2006 | Karandikar | 428/447.1 |
| 2007/0194490 A1 | 8/2007 | Bhatnagar | 264/258 |
| 2007/0283801 A1 | 12/2007 | Gallo | 89/36.02 |
| 2008/0170982 A1* | 7/2008 | Zhang et al. | 423/447.3 |
| 2009/0047502 A1 | 2/2009 | Folaron et al. | 428/327 |
| 2009/0104386 A1 | 4/2009 | Barrera et al. | 428/34.1 |
| 2009/0110897 A1 | 4/2009 | Humfeld et al. | 428/221 |
| 2009/0114083 A1 | 5/2009 | Moore et al. | 89/36.02 |
| 2009/0324966 A1* | 12/2009 | Benitsch et al. | 428/428 |
| 2010/0098877 A1* | 4/2010 | Cooper et al. | 427/551 |
| 2010/0147828 A1* | 6/2010 | Wang et al. | 219/546 |
| 2010/0203351 A1* | 8/2010 | Nayfeh | 428/622 |
| 2010/0278715 A1* | 11/2010 | Khe | 423/447.1 |
| 2010/0282668 A1* | 11/2010 | Cooper et al. | 210/500.21 |
| 2010/0288980 A1 | 11/2010 | Ittel | 252/503 |
| 2010/0300759 A1 | 12/2010 | Passade-Boupat et al. | 175/65 |
| 2010/0320439 A1 | 12/2010 | Jin et al. | 257/10 |
| 2010/0326813 A1 | 12/2010 | Mitra et al. | 204/157.43 |
| 2010/0326834 A1 | 12/2010 | Reynolds et al. | 205/50 |

OTHER PUBLICATIONS

Nanotube textile could make super-light armour; Mullins, J.; New Scientist-Tech, May 24, 2007; 2pp.

Carbon nanotube reinforced ceramic Matrix Composites—A Review, Samal et al, Journal of Minerals & Materials Characterization & Engineering, vol. 7, No. 4, pp. 355-370 (2008).

Body Armor Fit for a Superhero; Science & Technology, Aug. 7, 2006; 2pp.

Super-thin nanotube body armor promises to stop and deflect bullets; Cheung, H.; TG Daily, Nov. 6, 2007; 1 p.

Ballistic resistance capacity of carbon nanotubes; Mylvaganam et al; Nanotechnology 18 (2007); 4 pp.

Pending U.S. Appl. No. 12/657,244 filed Jan. 16, 2010, co-owned with U.S. Appl. No. 12/657,289, the present application.

Pending U.S. Appl. No. 12/657,288 filed Jan. 16, 2010, co-owned with U.S. Appl. No. 12/657,289, the present application.

U.S. Appl. No. 12/924,729, filed Oct. 4, 2010.

Siegel et al ; Mechanical Behavior of Polymer and Ceramic Matrix Nanocomposites; Scripta Materialia, vol. 44 ; pp. 2061-2064; 2001.

Chopra et al; Fully Collapsed Carbon Nanotubes; Nature; vol. 377; pp. 135-138; Sept. 14, 1995.

Kim et al; Improvement of Flexural Strength and Fracture toughness in Alimina Matrix Composites Reinforced with Carbon Nanotube; Materials Science and Engineering A; vol. 517; pp. 293-299; 2009.

Wei et al; A New Structure for Multi-Walled Carbon Nanotubes Reinforced Aluimina Composite with High Strength and Toughness; Materials Letters-Science Direct; vol. 62; pp. 641-644; 2008.

Fan et al: Preparation and Microstructure of Multi-Wall Carbon Nanotubes-Toughened $Al_2O_3$ Composite; Journal American Ceramic Society; vol. 89; pp. 750-753; 2006.

* cited by examiner

ARMOR WITH TRANSFORMED NANOTUBE MATERIAL

BACKGROUND OF THE INVENTION

1. Field of the Invention

The present invention is directed to armor made of ceramic with transformed nanotube material and to methods for making such armor.

2. Description of Related Art

There is a wide variety of known ceramic articles and methods for making them. There are known ceramic articles containing carbon nanotubes and methods for making them.

Prior patents and applications disclose a variety of carbon nanotubes, films, and coatings ceramic articles, ceramic articles containing carbon nanotubes, films, coatings and methods for making them; including, but not limited to, those in exemplary U.S. Pat. Nos. 7,581,645; 7,578,939; 7,442,414; 7,306,828; 7,122,710; 7,041,372; 6,911,260; 6,858,173; 6,826,996; 6,420,293; 5,824,940; 5,618,875; 5,424,054; U.S. application Ser. No. 12/189,684 filed 11 Aug. 2008; Ser. No. 12/025,626 filed 4 Feb. 2008; Ser. No. 11/924,948 filed 26 Oct. 2007; Ser. No. 11/659,407 filed 2 Aug. 2005; Ser. No. 11/656,603 filed 23 Jan. 2007; Ser. No. 11/579,750 filed 31 May 2005; Ser. No. 11/450,221 filed 9 Jun. 2006; Ser. No. 11/090,259 filed 25 Mar. 2005; Ser. No. 10/984,619 filed 9 Nov. 2004; Ser. No. 10/859,346 filed 3 Jun. 2004; Ser. No. 10/759,356 filed 16 Jan. 2004; Ser. No. 10/714,187 filed 14 Nov. 2003; Ser. No. 10/536,688 filed 25 Nov. 2003; and 10/366,183 filed 13 Feb. 2003; Ser. No. 10/182,081 filed 1 Feb. 2001; and Pct Applications PCT/US2004/019015; PCT/US2006/015919 (all said patents and applications incorporated fully herein for all purposes).

Graphite layers, graphene ribbons, and articles with them are well known. Exemplary patents and applications which disclose them include, but are not limited to, U.S. Pat. Nos. 7,550,129; 7,510,762; 7,396,494; 7,015,142; and 6,537,515; and U.S. application Ser. No. 12/243,165 filed 10 Oct. 2008 (which is not an exhaustive list; and all said patents and applications incorporated fully herein for all purposes).

Ceramic articles with carbon nanotubes are discussed in many publications, including, but not limited to, in "Carbon Nanotube Reinforced Ceramic Matrix Composites—A Review," Journal of Minerals & Materials Characterization & Engineering, Volume 7, Number 4, 2008, pp. 355-370. Graphene is discussed generally in many publications, including, but not limited to, in "Graphene: Carbon As Thin As Can Be," Chemical & Engineering News, Volume 87, Number 9, Mar. 2, 2009, pp. 14-20.

A wide variety of armor and armor employing ceramic material is known. Armor with ceramic and carbon nanotubes is known. Prior patents disclose various forms of armor, armor with ceramic material, and armor with ceramic material and carbon nanotubes, including, but not limited to (and meant only as an exemplary and not an exhaustive listing); U.S. Pat. Nos. 7,513,186; 7,041,372; 6,826,996; 6,568,310; 6,112,635; 5,996,115; 5,824,940; 5,763,813; 5,443,917; 5,377,935; 5,371,049; 5,361,678; 5,221,807; and U.S. patent application Ser. No. 12/189,684 filed 11 Aug. 2008; Ser. No. 11/656,603 filed 23 Jan. 2007; Ser. No. 11/450,221 filed 9 Jun. 2006; and Ser. No. 10/859,346 filed 3 Jun. 2004.

There has long been a need, recognized by the present inventors, for durable, effective low weight armor with carbon nanomaterial and efficient methods for making such armor.

SUMMARY OF THE PRESENT INVENTION

The present invention, in certain aspects, discloses armor which includes a ceramic article with a matrix of ceramic material and transformed nanotubes, e.g. graphene ribbon-like material, produced by subjecting nanotubes to pressure and heat, changing the nanotubes to non-tubular material. In one aspect, the ceramic material is alumina oxide. In one aspect, graphene ribbon-like material ("ribbons") in the finished article is produced by transforming (e.g. by crushing, milling, grinding, etc.) carbon nanotubes in a mixture of ceramic material. In certain aspects the nanotubes, prior to transformation, are single-walled nanotubes, double walled nanotubes, surface-modified nanotubes, multi-walled nanotubes, or combinations thereof. In one particular aspect, graphene ribbon-like material is added to the matrix before pressure is applied.

In certain aspects, the armor is a backing only (with or without nanotubes therein, with or without transformed nanotubes therein); or includes a backing with at least one layer or with multiple layers of ballistic fabric interleaved with a binder material containing nanotubes ("nanotube-modified binder material"). The nanotubes may either be coated on the surface of the binder material or they may be incorporated into a binder material matrix. In certain aspects the nanotubes, prior to transformation, are single-walled nanotubes, double walled nanotubes, surface-modified nanotubes, multi-walled nanotubes, or combinations thereof. The backing may be backed with protective laminate on both sides. The backing, in one aspect, is a polymeric film with nanotubes therein and, in one particular aspect, is a nanofilm with transformed nanotubes, e.g. a graphene ribbon nanofilm.

In one aspect, a laminated backing according to the present invention is made by pressing the components at a desired pressure and temperature. In one aspect, the resulting backing is formed in a desired shape, e.g. using temperature and/or pressure. In certain aspects, the ballistic fabric has nanotubes therein and/or transformed nanotubes. Ballistic fabric includes, but is not limited to, ARAMID (trademark) fiber fabric, KEVLAR (trademark) material polyethylene ballistic fabric material, and SPECTRA (trademark) material.

In another aspect, the armor includes a backing having multiple layers of ballistic fabric which contains nanotubes ("nanotube-modified ballistic fabric"). The nanotubes exist, in certain aspects, as a coating on the surface of the ballistic fabric; the nanotubes are fabricated ("grown") directly on the surface of the fabric; or the nanotubes are incorporated into a matrix of the ballistic fabric. In addition, the nanotube-modified ballistic fabric layers may be interleaved with a binder material. The binder material may or may not contain nanotubes and/or transformed nanotubes, as described above. Such a backing may then be backed with protective laminate on both sides. The laminated backing is made by pressing the components at a desired pressure and temperature. In one aspect, the resulting backing is formed in a desired shape, e.g. using temperature and/or pressure. In certain aspects the nanotubes, prior to transformation, are single-walled nanotubes, double walled nanotubes, surface-modified nanotubes, multi-walled nanotubes, or combinations thereof.

In one aspect, the armor according to the present invention includes a backing with multiple layers of ballistic fabric interleaved with thin films of nanotubes, commonly referred to as "buckypaper". In certain aspects the buckypaper nanotubes are single-walled nanotubes, double walled, nanotubes, multi-walled nanotubes, surface-modified nanotubes, or combinations thereof. In addition, the backing may contain nanotube-modified ballistic fabrics and/or nanotube-modified binder materials as described above. Such a backing according to the present invention may then be backed with protective laminate on both sides. This laminated backing is made by pressing the components at a desired pressure and temperature. In one aspect, the resulting backing is formed in a desired shape, e.g. using temperature and/or pressure.

In another aspect, a backing according to the present invention is combined with other material(s) and/or structure(s) to produce a multi-component armor usable on things and on persons.

In one aspect, the ceramic article is a matrix of ceramic material and transformed nanotubes e.g. graphene ribbon-like material ("ribbons), in which the ceramic material is sintered together, with the transformed material incorporated into the sintered matrix.

In certain aspects, a ceramic article according to the present invention is made using a mold with a particular shape. The mold may be any desired shape to produce a ceramic article of a desired shape (e.g., but not limited to, the shapes shown in the drawing figures herein). In other aspects, an article made according to the present invention is etched, cut, sanded, machined, water-jet cut, or laser cut to achieve a desired shape.

In certain aspects, a finished ceramic article according to the present invention with ceramic material and transformed nanotubes, e.g. graphene ribbons, also contains one or more of: single-walled nanotubes; double-walled nanotubes; multi-walled nanotubes; surface-modified nanotubes, and/or graphene ribbons not produced by crushing, etc. during making of a ceramic article.

Heat may be applied to a matrix according to the present invention using any suitable known heating apparatus and any suitable known method, including, but not limited to, conventional oven sintering, microwave assisted sintering, and spark plasma sintering.

Filed on even date herewith, co-owned with the present invention, and incorporated fully herein for all purposes is U.S. patent application Ser. No. entitled "Ceramic Articles and Methods." Filed on even date herewith, co-owned with the present invention, and incorporated fully herein for all purposes is U.S. patent application Ser. No. entitled "Metallized Nanotubes."

Accordingly, the present invention includes features and advantages which are believed to enable it to advance armor technology. Characteristics and advantages of the present invention described above and additional features and benefits will be readily apparent to those skilled in the art upon consideration of the following description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions of embodiments preferred at the time of filing for this patent that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain embodiments of the invention, other objects and purposes will be readily apparent to one of skill in this art who has the benefit of this invention's teachings and disclosures. It is, therefore, an object of at least certain embodiments of the present invention to provide the embodiments and aspects listed above and:

New, useful, unique, efficient and nonobvious multi-layered armor which includes ceramic and transformed nanotubes, e.g. but not limited to graphene ribbon-like material, produced by subjecting nanotubes to pressure and heat;

New, useful, unique, efficient and nonobvious laminated multi-layered armor material which includes ceramic transformed nanotubes, e.g., and graphene ribbon-like material;

New, useful, unique, efficient and nonobvious multi-layered armor which includes ceramic and ribbons according to the present invention, and, optionally, additional components; and New, useful, unique, efficient and nonobvious ceramic articles with ribbons.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, various purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly, from a cursory inspection or review the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate embodiments preferred at the time of filing for this patent and are not to be used to improperly limit the scope of the invention which may have other equally effective or legally equivalent embodiments.

Certain embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of certain embodiments and are not intended to limit the invention or the appended claims. On the contrary, the intention is to cover all modifications, equivalents and alternatives falling within the spirit and scope of the invention as defined by the appended claims. In showing and describing these embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiments, and are not intended to mean the claimed invention of any particular appended claim(s) or all of the appended claims. Accordingly, the subject or topic, of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein. The drawing figures present the embodiments preferred at the time of filing for this patent.

DETAILED DESCRIPTION OF THE INVENTION

Figure 1:
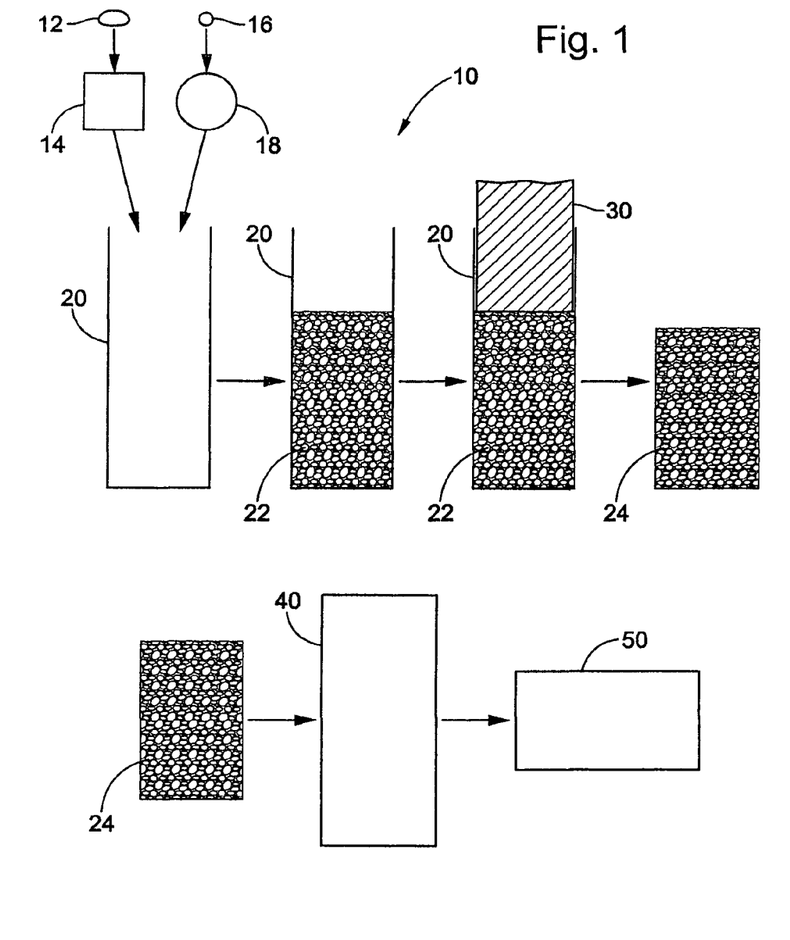
FIG. 1 is a schematic view of a method according to the present invention.

FIG. 1 illustrates schematically a method 10 according to the present invention. Ceramic material 12 is processed in a processing apparatus 14 and then processed ceramic material is introduced into a mold 20. In one aspect the processing apparatus 14 produces ceramic material within a desired size (largest dimension) range. In one particular aspect the ceramic material is aluminum oxide (alumina) particles and the processing apparatus 14 is a dry ball mill which mills the particles to a median size (largest dimension) of about 700 nanometers (in one aspect within a range of between 10 nanometers and 100 microns), with the milled particles having a surface area between 3.5 to 4.5 square meters per gram.

Carbon nanotube material 16 is processed by a processing method 18 and then processed ("transformed") nanotube material is introduced into the mold 20. In one aspect, the carbon nanotube material is multi-walled nanotubes. In other aspects, it is any desired nanotube material, including, but not limited to, any nanotube material disclosed or referred to herein, and, e.g. functionalized nanotubes. In one aspect of a method 18, the nanotubes are suspended in ethanol in a bath using any known suitable sonication method for an amount of time sufficient to achieve deagglomeration of bundles of nanotubes, to create a metastable nanotube suspension, and to wet the nanotube surfaces with ethanol, e.g. for about thirty minutes. In one particular aspect, a two-vessel sonication method is used with transducers and wave transfer liquid. The resulting nanotube-ethanol mixture is added to an aluminum oxide-ethanol mixture and the resulting mixture is sonicated. The resulting sonicated mixture is then stirred to produce a homogeneous) mixture, e.g. for about one hour. The stirred mixture is poured into a container so that the ethanol in the mixture evaporates, e.g. the container is a baking dish and the mixture is allowed to sit overnight, e.g. about eight to ten hours, for ethanol evaporation. The resulting dried material is then baked (to insure all water and ethanol are removed), e.g. at eighty degrees centigrade in a vacuum oven for two to three hours. The resulting material is then milled in a ball mill, e.g. to within a size range between ten nanometers and one hundred microns. Then milled material is introduced into the mold 20 producing a ceramic-material/nanotube mixture 22 in the mold 20.

In one aspect the alumina and multi-walled nanotube material in the mold is between 0.1% to 10% by weight nanotubes, the remainder alumina. In one particular aspect, the material in the mold is between 0.1% to 1.0% by weight nanotubes.

A compression member 30 is applied to the mixture 22 in the mold at a pressure sufficient to achieve crushing of the nanotubes producing graphene ribbon-like material ("ribbons") in the mixture. In one aspect, the mixture 22 is compressed at between 10,000 psi and 100,000 psi. A compressed mixture 24 is produced. The produced ribbon-like material is one to ten microns in length and one to one hundred nanometers wide (in one aspect, one to ten nanometers wide).

The compressed mixture 24 is sintered in a furnace 40 producing a finished ceramic article 50. In one particular aspect in which the ceramic material is the alumina described above and the nanotubes are the multi-walled carbon nanotubes described above, the mixture 24 is sintered at about 1600 degrees C. for 0.5 hours to 24 hours in an inert (e.g. nitrogen, argon) atmosphere. The heated material is then cooled (using any suitable known cooling technique and/or cooling apparatus).

Prior to solvent evaporation and pressing, and/or prior to sintering, additional nanotube material and/or graphene ribbon-like material may be introduced into the mixture 24.

The mold 20 may be of any desirable shape and configuration to produce a finished article of any desirable shape and configuration.

Figure 2A:
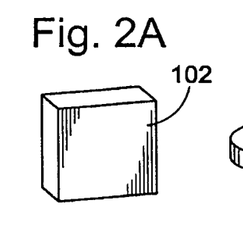
FIG. 2A is a perspective view of a tile according to the present invention.

In addition to producing finished articles useful in armor, methods according to the present invention are useful for producing items, things, parts, tools and objects made, in whole or in part, with transformed nanotubes, e.g., graphene ribbon-like material as described above. FIGS. 2A-2Y present a variety of exemplary items, etc. made with ceramic material with transformed nanotubes, e.g. graphene ribbons, according to the present invention. These depictions are not meant to be exhaustive of all the items, etc. that can be made with the material according to the present invention, but are only presented here as some of the examples of such items, etc. For each of the things in FIGS. 2A-2Y, as described below transformed nanotubes of any type maybe used instead of (or in addition to) the stated graphene ribbon-like material, according to the present invention.

FIG. 2A shows a tile 102 made with ceramic material with ribbons according to the present invention.

Figure 2B:
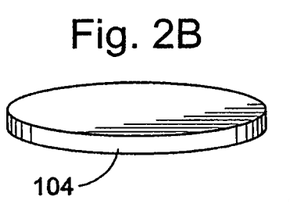
FIG. 2B is a perspective view of a disc according to the present invention.

FIG. 2B shows a disc 104 made with ceramic material with ribbons according to the present invention.

Figure 2C:
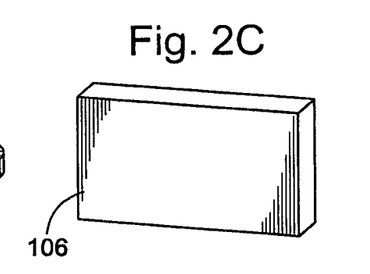
FIG. 2C is a perspective view of a panel according to the present invention.

FIG. 2C shows a panel 106 made with ceramic material with ribbons according to the present invention.

Figure 2D:
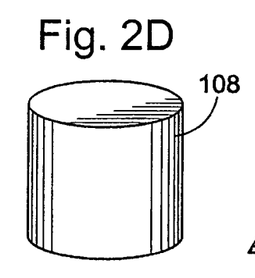
FIG. 2D is a perspective view of a cylinder according to the present invention.

FIG. 2D shows a cylinder 108 made with ceramic material with ribbons according to the present invention.

Figure 2E:
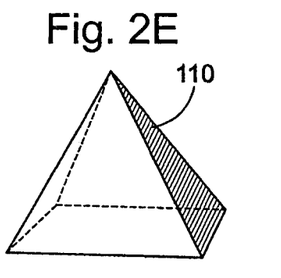
FIG. 2E is a perspective view of a pyramid according to the present invention.

FIG. 2E shows a pyramid 110 made with ceramic material with ribbons according to the present invention.

Figure 2F:
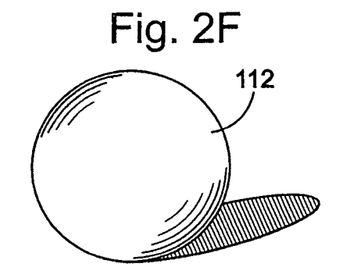
FIG. 2F is a perspective view of a sphere according to the present invention.

FIG. 2F shows a sphere 112 made with ceramic material with ribbons according to the present invention.

Figure 2G:
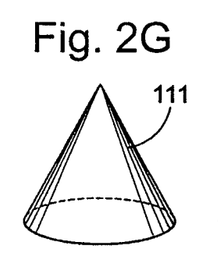
FIG. 2G is a perspective view of a cone according to the present invention.

FIG. 2G shows a cone 111 made with ceramic material with ribbons according to the present invention.

Figure 2H:
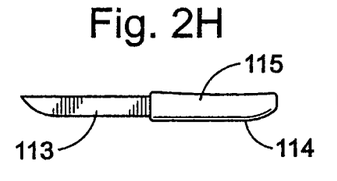
FIG. 2H is a side view of a knife according to the present invention.

FIG. 2H shows a knife 114 made with ceramic material with ribbons according to the present invention. A knife blade 113 and/or a handle 115 may be made from the material according to the present invention.

Figure 2I:
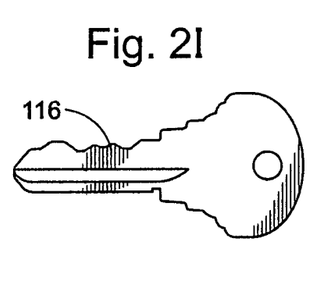
FIG. 2I is a side view of a key according to the present invention.

FIG. 2I shows a key 116 made with ceramic material with ribbons according to the present invention.

Figure 2J:
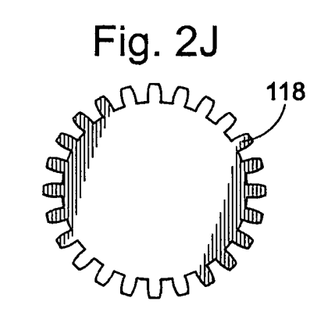
FIG. 2J is a side view of a gear according to the present invention.

FIG. 2J shows a gear 118 made with ceramic material with ribbons according to the present invention.

Figure 2K:
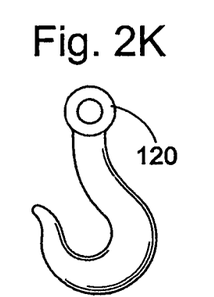
FIG. 2K is a side view of a hook according to the present invention.

FIG. 2K shows a hook 120 made with ceramic material with ribbons according to the present invention.

Figure 2L:
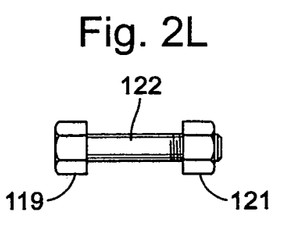
FIG. 2L is a side view of a nut-bolt combination according to the present invention.

FIG. 2L shows a nut-bolt combination 122 made with ceramic material with ribbons according to the present invention with a bolt 119 and/or a nut 121 made with material according to the present invention.

Figure 2M:
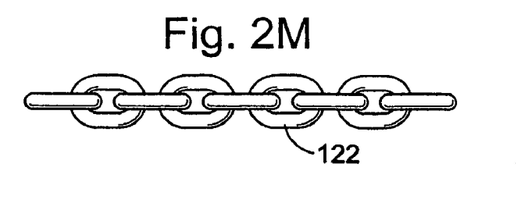
FIG. 2M is a side view of a chain according to the present invention.

FIG. 2M shows a chain 122 made with ceramic material with ribbons according to the present invention.

Figure 2N:
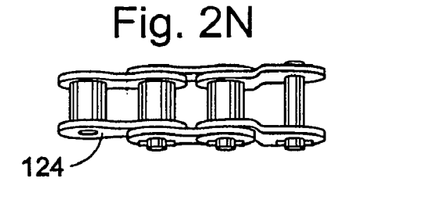
FIG. 2N is a top view of a chain according to the present invention.

FIG. 2N shows a chain 124 made with ceramic material with ribbons according to the present invention.

Figure 2O:
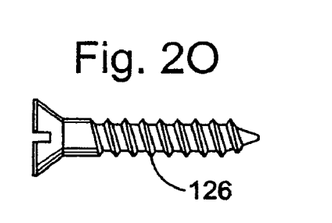
FIG. 2O is a side view of a screw according to the present invention.

Any known connector may be made of material according to the present invention (with ceramic and transformed nanotubes, e.g., but not limited to, graphene ribbon-like material) e.g., but not limited to, brads, tacks, rivets, bolts, nails and screws. FIG. 2O shows a screw 126 made with ceramic material with ribbons according to the present invention.

Surgical, dental, and orthodontic tools may be made, in whole or in part, with material according to the present invention.

Figure 2P:
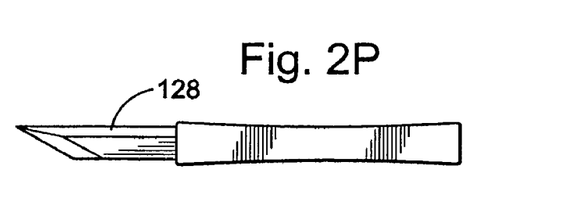
FIG. 2P is a side view of a scalpel according to the present invention.

FIG. 2P shows a scalpel 128 made with ceramic material with ribbons according to the present invention.

Figure 2Q:
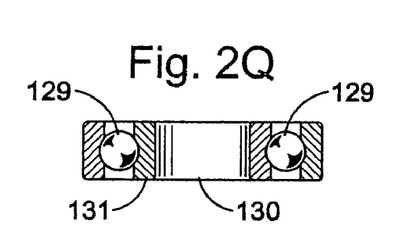
FIG. 2Q is a cross-section view of a bearing structure according to the present invention.

FIG. 2Q shows a bearing structure 130 made with ceramic material with ribbons according to the present invention with bearings 129 and/or bearing support 131 made with material according to the present invention.

It is within the scope of the present invention for all or part of a bit, mill or reamer to be made of (or coated with) material according to the present invention, including, but not limited to bit bodies, mill bodies, reamer bodies, cutting blades, milling blades, reaming blades, cutting surfaces, cutters, cutting inserts, milling surfaces, and/or reaming surfaces for bits, mills, and/or reamers for metal working, wood working, machining and/or for wellbore downhole drilling, milling and reaming. It is within the scope of the present invention for all or part of a valve (e.g., valve body, valve seat, valve member, ball) to be made of material according to the present invention.

Figure 2R:
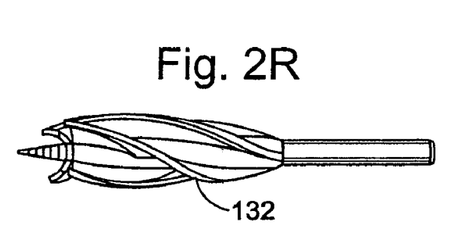
FIG. 2R is a side view of a drill bit according to the present invention.

FIG. 2R shows a drill bit 132 made with ceramic material with ribbons according to the present invention.

Figure 2S:
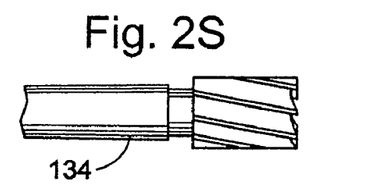
FIG. 2S is a side view of a mill according to the present invention.

FIG. 2S shows a mill 134 made with ceramic material with ribbons according to the present invention.

Figure 2T:
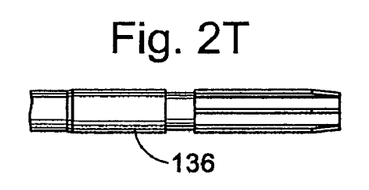
FIG. 2T is a side view of a reamer according to the present invention.

FIG. 2T shows a reamer 136 made with ceramic material with ribbons according to the present invention.

Figure 2U:
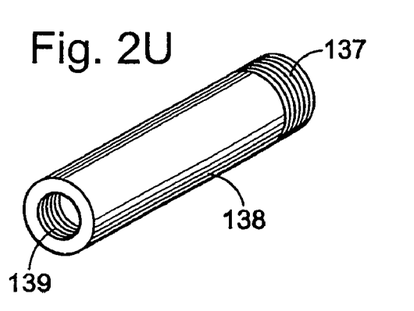
FIG. 2U is a perspective view of a pipe according to the present invention.

FIG. 2U shows a pipe 138 made with ceramic material with ribbons according to the present invention. Optionally a threaded area 137 and/or a threaded area 139 is made with (or coated with) material according to the present invention.

Figure 2V:
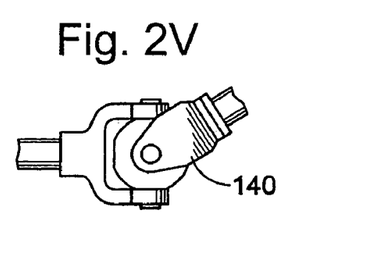
FIG. 2V is a side view of a universal joint according to the present invention.

FIG. 2V shows a universal joint 140 made with ceramic material with ribbons according to the present invention.

Figure 2W:
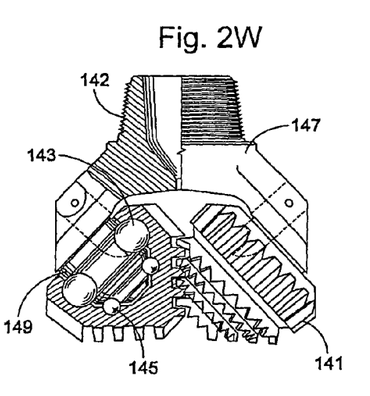
FIG. 2W is a side view partially in cross-section of a drill bit according to the present invention.
Figures 2X, 2Y:
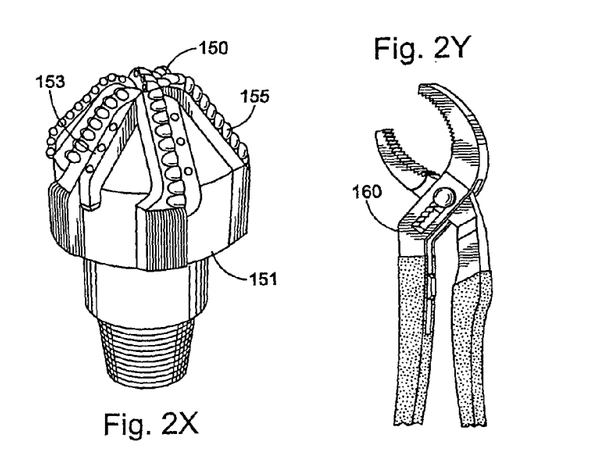
FIG. 2X is a perspective view of a drill bit according to the present invention.
FIG. 2Y is a side view of pliers according to the present invention.

FIG. 2W shows a drill bit 142 made with ceramic material with ribbons according to the present invention with roller cones 141, bearings 143, 145 with body 147 and/or seal 149 made with material according to the present invention.

FIG. 2X shows a drill bit 150 made with ceramic material with ribbons according to the present invention with a body 151, blades 153, and/or cutters (or cutting inserts) 155 made with material according to the present invention.

Hand tools, including, but not limited to wrenches, screwdrivers, awls, chisels, hammers, saws, pliers, scissors, may be made, in whole or in part, with material according to the present invention.

FIG. 2Y shows pliers 160 made with ceramic material with ribbons according to the present invention.

U.S. Pat. No. 6,420,293 discloses ceramic matrix nanocomposites containing carbon nanotubes and methods for making them. Unlike the present invention, U.S. Pat. No. 6,420,293 has no teaching or suggestion of using graphene or graphene ribbon-like material in a ceramic article and no teaching or suggestion of methods for producing transformed nanotubes, e.g. ribbons, in a ceramic mixture. The present invention provides various new and nonobvious improvements for the articles and the methods of U.S. Pat. No. 6,420,293 (which patent is incorporated fully herein for all purposes).

The present invention discloses, in certain aspects, a ceramic matrix composite which includes graphene ribbon-like material, and nanocrystalline ceramic material (and/or ceramic powder), with or without other nanotube material and methods for producing ceramic articles with such material. The graphene ribbon-like material (for transformed nanotubes) may be made during the process of making the ceramic matrix composite from nanotube material; or ribbons may be mixed with ceramic material. The nanocrystalline ceramic material (or ceramic powder) may be a ceramic metal oxide. The metal of the ceramic metal oxide may be aluminum, titanium, zirconium, magnesium, yttrium, or cerium. In particular, the metal may be aluminum, titanium or zirconium. Specifically, the metal oxide may be alumina. In certain aspects, the amount of ribbons in the composite is about 0.5 to 50 parts by volume; the amount of ceramic matrix is about 50 to 99.5 parts by volume and, in one particular aspect, the amount of ribbons may be 1 to 20 parts by volume, and the amount of ceramic matrix about 80 to 99 parts by volume. The ceramic material may be a carbide or nitride, e.g., silicon carbide, boron nitride, or boron carbide.

In certain aspects, the present invention provides methods for producing ceramic articles including combining transformed nanotubes, e.g., ribbons, according to the present invention and a ceramic matrix having at least one nanocrystalline ceramic material; forming an article therefrom; and heating, optionally sintering, the article under elevated pressure at elevated temperature. Optionally, the ribbons are made by crushing nanotube material which has been mixed with the ceramic material. The nanocrystalline ceramic material may be a ceramic metal oxide. The metal of the ceramic metal oxide may be aluminum, titanium, zirconium, magnesium, yttrium, or cerium. In particular, the metal may be aluminum, titanium or zirconium. In one aspect, the metal oxide is alumina. In certain aspects, the amount of ribbons in the composite is about 0.5 to 50 parts by volume; the amount of ceramic matrix is about 50 to 99.5 parts by volume. In particular aspects, the amount of ribbons is 1 to 20 parts by volume, and the amount of ceramic matrix about 80 to 99 parts by volume.

Figure 3A:
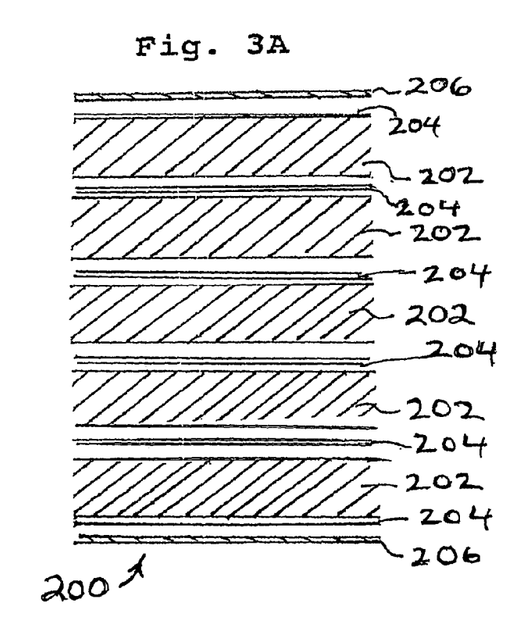
FIG. 3A is a cross-section view of a backing made according to the present invention.

FIG. 3A shows an exploded view of a backing 200 (armor) according to the present invention (the drawing is not to scale) which includes multiple layers of ballistic fabric 202, which may be any known ballistic fabric, including, but not limited to KEVLAR (Trademark) material, ARAMID (Trademark) fabric material, SPECTRA SHIELD (Trademark) material, and polyethylene ballistic material. Between fabric layers 202 is a layer (or layers) 204 of binder material (any disclosed herein). In one particular aspect, the binder material is sprayed onto the fabric. In one aspect the binder material is any suitable known binder material with or without nanotubes therein. The binder material can be a sheet of plastic, or an epoxy coating, or a spray-on adhesive.

In one aspect the binder 204 is an armor article made according to the present invention which contains carbon nanotubes. In one aspect the binder 204 is a thin film of carbon nanotubes ("buckypaper"). In one aspect, the binder 204 contains carbon nanotubes and/or graphene ribbon-like material. Any binder or film according to the present invention can also include a suitable adhesive (with or without nanotubes therein, with or without ribbons therein) to facilitate adherence to fabric, e.g., but not limited to, spray adhesive 911 from 3M or ABF spray adhesive. In certain aspects, the layers 204 are thermoplastic nanocomposite film which has carbon nanotubes (as the material in U.S. patent application Ser. No. 12/025,662 filed 4 Feb. 2008).

In certain particular aspects the film 204 is a thermoplastic polyurethane (or any suitable thermoplastic or hot melt adhesive) with or without added nanotubes or added ribbons. In one aspect, the binder 204 is a thermoplastic sheet with ten milligrams of carbon nanotubes per three grams of thermoplastic material.

In certain aspects, nanotubes or ribbon-like material is present in the binder at 0.001% to 10% by weight. In certain aspects, the fabric 202 has between 0.1% to 10% by weight nanotubes or ribbon-like material (either on a fabric surface or surfaces or in the fabric).

Figure 3B:
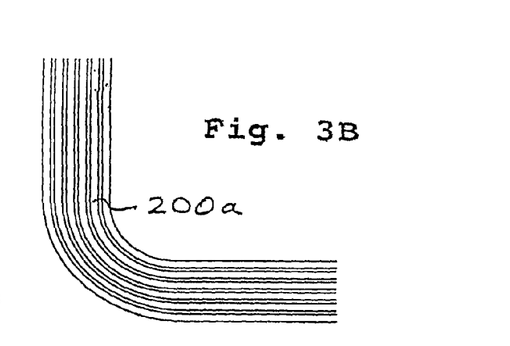
FIG. 3B is a cross-section view of a backing as in FIG. 3A formed according to the present invention.

To form a backing according to the present invention a laminate layer 206 is placed on each side of the outermost films 204 and in a press apparatus, the combination is pressed, e.g. at between 100 and 10,000 psi while heated, e.g. to between 25 degrees C. and 300 degrees C. The resulting backing 200 can be formed into a desired shape by applying pressure to it, e.g., with a mold of desired shape and/or by heating it, e.g. in a heated press and then bending it or otherwise mechanically shaping it. FIG. 3B illustrates a backing 200a which has been formed with a ninety-degree bend. A backing according to the present invention may be any suitable thickness and, in certain aspects, ranges between 0.1 and 10 inches thick. A backing according to the present invention may be formed into any desired shape. Such a backing may itself be used as "soft" armor, e.g. for vehicles, aircraft (planes, helicopters, etc), and boats, or for parts thereof.

It is within the scope of this invention to use any desired number of fabric layers 202 including, but not limited to one, two, three, four, five, six, seven, eight, nine or ten. In certain aspects the fabric layers 202 are 0.0001 inches and 0.01 inches thick. In certain aspects, the binders or films 204 are between 0.0001 and 0.01 inches thick.

Figure 3C:
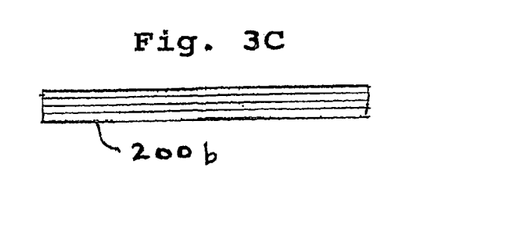
FIG. 3C is a side view of a backing according to the present invention.

FIG. 3C shows a backing 200b, like the backings 200 or 200a, which is used as armor for a thing or for a person.

Figure 4A:
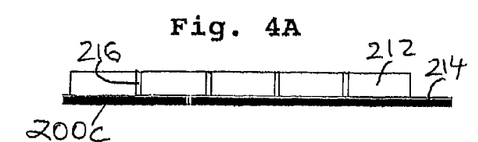
FIG. 4A is a cross-section view of armor according to the present invention.
Figure 4B:
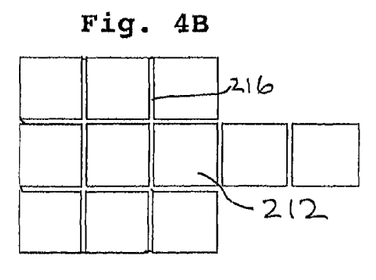
FIG. 4B is a top view of the armor of FIG. 4A.

FIGS. 4A and 4B show an armor structure 210 according to the present invention which has a backing 200c (like any backing described above according to the present invention) to which are adhered tiles 212 using adhesive 214. The tiles 212 may be any known tile used in armor or the tiles 212 may be made as described above by a method according to the present invention as an article according to the present invention with ceramic and graphene ribbons.

In one aspect, the adhesive 214 (and any adhesive in any backing, armor or armor structure according to the present invention) is any suitable known adhesive. In one particular aspect the adhesive 214 is a polymer epoxy adhesive, (e.g. as in U.S. application Ser. No. 10/559,905 filed 16 Jun. 2004). Any adhesive disclosed or referred to herein may, according to the present invention, have carbon nanotubes and/or transformed nanotubes therein, or both, as taught by the present invention.

An adhesive 216 is used between adjacent tiles 212. In one aspect, the adhesive 216 is any suitable known adhesive. In one aspect, the adhesive 216 is chosen for its elongation ability and its ability to withstand impacts.

The tiles 212 may have any suitable dimensions and any suitable shape (e.g. but not limited to, rectangular, square, triangular, parallelogram, pentagonal and hexagonal). In one particular aspect, the tiles are square and are two inches by two inches.

In adhering the tiles 212 to the backing 200c, the tiles 212 may be pressed against the backing 200c with heat, using a heated press with a heated platen(s) or roller(s).

As shown in FIG. 4B, the tiles 212 are arranged in order with tiles 212 in one row, as viewed in FIG. 4B, lined up with tiles 212 in another row. Also, it is within the scope of the present invention to stack tiles one, two, three, etc. deep and, in one aspect, to have the stacked tiles line up with each other; or (as shown in FIG. 5C) to have stacked tiles offset from each other.

Figure 4C:
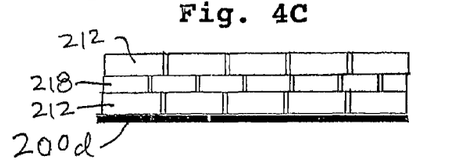
FIG. 4C is a cross-section view of armor according to the present invention.

It is also within the scope of the present invention to stack tiles of different thickness; e.g., as shown in FIG. 4C, a backing 200d made as any backing according to the present invention described above, has tiles 212 in two columns with tiles 218 of a different thickness in an intermediate column. Different tiles may also, according to the present invention, be used in different rows (e.g. as in the rows of FIG. 4B).

Figure 5A:
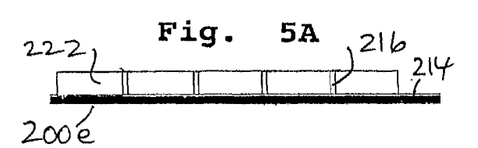
FIG. 5A is a cross-section view of armor according to the present invention.
Figure 5B:
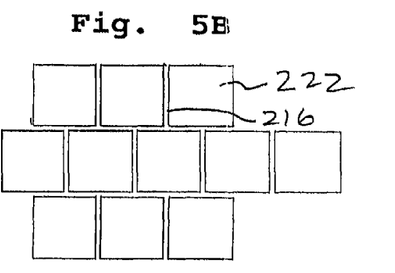
FIG. 5B is a cross-section view of armor like that of FIG. 5A.
Figure 5C:
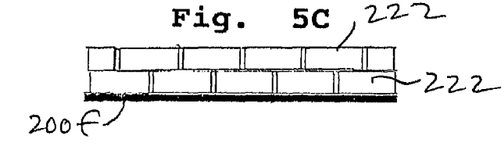
FIG. 5C is a cross-section view of armor according to the present invention.

FIG. 5A shows a backing 200e made as any backing above according to the present invention which has tiles 222 adhered thereto. As shown in FIG. 5B, tiles 222 in adjacent rows are offset with respect to each other. Adhesives 214 and 216 are used as in the structure of FIG. 4A.

Figure 5D:
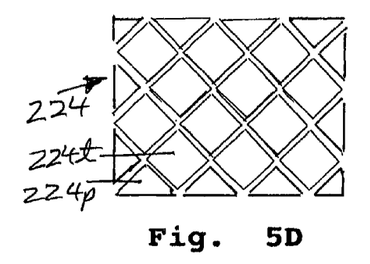
FIG. 5D is a top view of armor according to the present invention.

Tiles according to the present invention may be used in patterns different from those in preceding figures. For example, see FIGS. 5D-5F. FIG. 5D shows armor 224 according to the present invention which is like the armor structure 210, but in which tiles 224t are in a diamond pattern employing partial tiles 224p. Adhesive used with these tiles is like that of the structures of FIGS. 4A-5C.

Figure 5E:
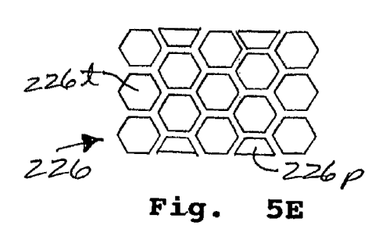
FIG. 5E is a top view of armor according to the present invention.

FIG. 5E shows armor 226 according to the present invention which is like the armor structures of FIGS. 4A-5D, but which has tiles 226t, as viewed from above, of a generally hexagonal shape. Partial tiles 226p are used at the structure's edges. Adhesive used with these tiles is like that of the structures of FIGS. 4A-5C.

Figure 5F:
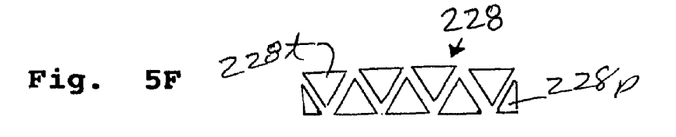
FIG. 5F is a top view of armor according to the present invention.

FIG. 5F shows armor 228 according to the present invention which is like the armor structures of FIGS. 4A-5D, but which has tile 228t which are generally triangular as viewed from above and partial tiles 228p at edges. Adhesive used with these tiles is like that of the structures of FIGS. 4A-5C.

As shown in FIG. 5C, two (three, four, five or more) columns of tiles 222 may be used as in a backing 200f (made as any backing described above according to the present invention) with tiles in one column offset from those in an adjacent column.

The present invention provides improvements to the laminate barrier panel of U.S. Pat. No. 6,568,310 (incorporated fully herein for all purposes) and the panel according to the present invention is new and nonobvious compared to the panel of this patent. This patent has no teaching or suggestion to use carbon nanotubes, graphene or graphene ribbons as taught by the present invention.

Figures 6A, 6B, 7A:
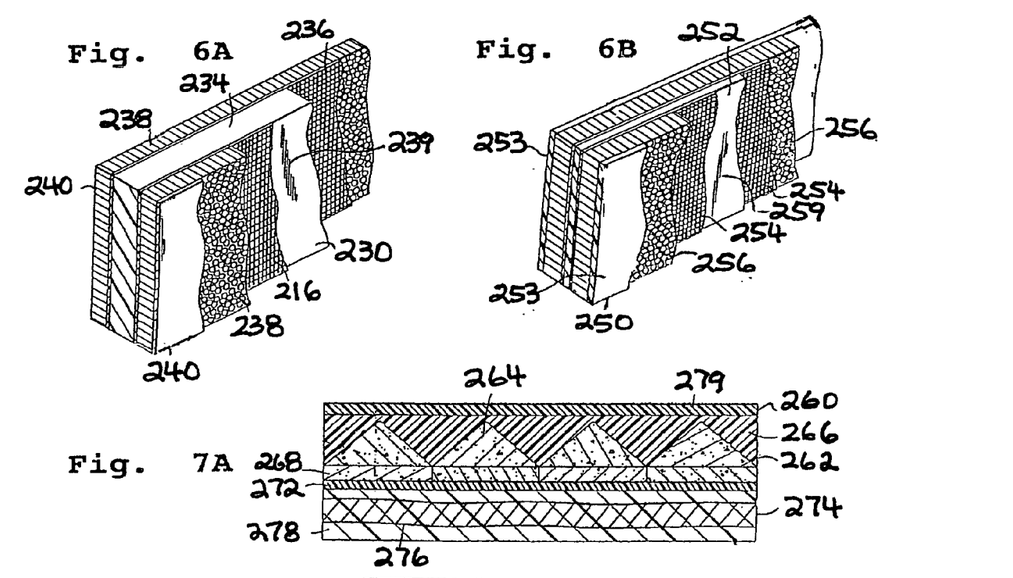
FIG. 6A is a perspective partially cut-away view of armor according to the present invention.
FIG. 6B is a perspective partially cut-away view of armor according to the present invention.
FIG. 7A is a cross-section view of armor according to the present invention.

A panel 230 according to the present invention as shown in FIG. 6A has a layer 234 between two layers 236 of a mesh or mail material. A layer 238 of body material is located outwardly of the layers 236. Optionally, the layers 238 are covered by sheets or laminate 240. Optionally, adhesive is used between adjacent layers and/or to secure the sheets 20 to the layers 238. The layers 236 may be mesh or mail layers.

It is within the scope of the present invention to spray a film 239 (shown on a side of the layer 234) containing carbon nanotubes and/or ribbons according to the present invention onto any, some, or all surfaces of all layers of the panel 230 (as is true also for any embodiment herein with layers or plates). It is within the scope of the present invention to include ribbons according to the present invention in any, some, or all layers of the panel 230. It is within the scope of the present invention for any, some or all of the layers 234, 236, and/or 238 to be a suitable article with ceramic and ribbons according to the present invention made by any method according to the present invention described above.

FIG. 6B shows a panel 250 according to the present invention which has a central layer 252 with a mesh or mail layer 254 on either side. Layers 256 of relatively light weight body material are on sides of the layers 254 and layers 258 are on sides of the layers 256. Layers 253 are on sides of the layers 256. The layers 252, 253, 256 and/or the layers 258 (as may be the layer 234, FIG. 6A) are, in one aspect made of ballistic material which includes ceramic and ribbons according to the present invention. As with the panel 230, the layers of the panel 250 are connected together with an adhesive.

It is within the scope of the present invention to spray a film 259 (shown on a side of the layer 252) containing carbon nanotubes and/or graphene ribbons onto any, some, or all surfaces of all layers of the panel 250. It is within the scope of the present invention to include ribbons according to the present invention in any, some, or all layers of the panel 250. It is within the scope of the present invention for any, some or all of the layers 252, 254, and 256 to be a suitable article with ceramic and ribbons made by any method according to the present invention described above.

The present invention provides new and nonobvious armor as compared to the composite armor of U.S. patent application Ser. No. 11/656,603 filed Jan. 23, 2007 (incorporated fully herein for all purposes). This patent application has no teaching or suggestion of using carbon nanotubes, graphene or graphene ribbon-like material as taught by the present invention.

An armor structure 260 according to the present invention as shown in FIG. 7A has a layer 262 (e.g. 5 mm to 60 mm thick) provided to disrupt an incoming projectile. Any, some, or all of the components of this layer 262 described below may be a suitable article made according to the present invention as described above or may have ceramic and graphene ribbons as described above.

In one aspect the layer 262 includes tiles 264 (made in certain aspects as any tile described above according to the present invention) retained with a retaining material 266 (e.g. any suitable adhesive or polymer). Each tile 264 may be polygonal with a base 268 (e.g. bases between 30 mm and 60 mm wide). A backing 274 is adjacent the layer 262 (optionally, with a layer of adhesive 272 between them). The backing 274 may be like any backing according to the present invention described above or may be the lacking of the above-identified patent application Ser. No. 11/656,603. The backing 274 may include a reinforcing layer 276 encased with a polymer 278. An optional spall layer 279 may be provided in the material 266. The spall layer may be any suitable fragment-containing material, e.g. synthetic plastic, thermoplastic, polycarbonate, or polymeric.

Figure 7B:
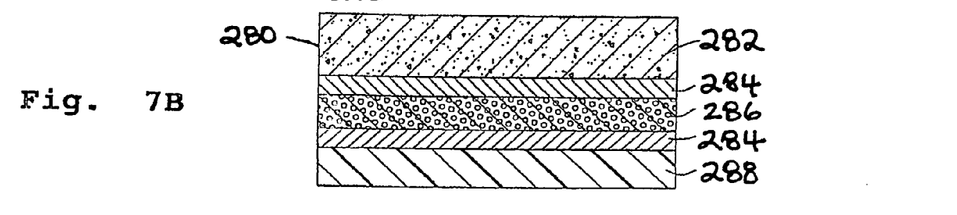
FIG. 7B is a cross-section view of armor according to the present invention.

FIG. 7B shows an armor structure 280 according to the present invention which has a tile layer 282, confining layers 284, a ceramic layer 286 and a backing layer 288. The tile layer 282 may be made as any tile according to the present invention described above. The confining layers 284 may be any backing according to the present invention described above, a layer of ribbons (and/or of carbon nanotubes) according to the present invention, or a metal or fiber reinforced composite (with or without ribbons, with or without carbon nanotubes). The ceramic layer 286 may be any suitable backing according to the present invention described above or it may be a suitable article according to the present invention with ceramic, carbon nanotubes, and/or ribbons according to the present invention as described above. Layers of the armor structure 280 may be adhered together with adhesive and any, some, or all of the layers may have a film with graphene ribbons and/or carbon nanotubes thereon.

Figures 7C, 7D:
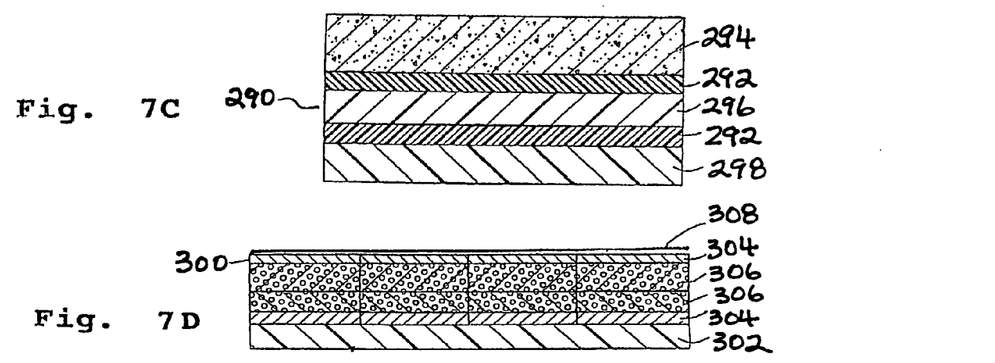
FIG. 7C is a cross-section view of armor according to the present invention.
FIG. 7D is a cross-section view of armor according to the present invention.

FIG. 7C shows an armor structure 290 according to the present invention which has a tile layer 294 between adhesive layers 292. A strengthening layer 296 is provided between the layers 292. A backing layer 298 is provided adjacent one of the layers 292. The tile layer 294 may be any tile or tiles according to the present invention described above; a suitable backing according to the present invention (any as described above); a layer including ceramic and graphene ribbons; or a suitable article according to the present invention (any as described above) with ceramic and graphene ribbons. The adhesive layers 292 may be any suitable known adhesive or, according to the present invention, an adhesive with nanotubes and/or ribbons. The layer 296 may be any suitable backing according to the present invention or any suitable article according to the present invention described above or a glass layer of strengthened glass; glass and ceramic; or glass, ceramic and graphene ribbons and/or with carbon nanotubes. The layer 298 may be any backing according to the present invention or article according to the present invention described above.

FIG. 7D shows an armor structure 300 according to the present invention which has ceramic layers 306 encased in an optional shell (e.g. cam or cylinder) 308 with optional confining layers 304 and a backing layer 302. The confining layers 304 may be like the layers 54 in U.S. application Ser. No. 11/656,603 or they may be any backing according to the present invention or article according to the present invention described above. Optionally the confining layer may contain ribbons and/or nanotubes (e.g but not limited to carbon nanotubes) according to the present invention or ceramic with ribbons.

As with the layers of the structures of FIGS. 7A-7C the layers of the structure 300 may be adhered together with suitable adhesive. As with any layer, article, backing or component of any of the disclosures of FIGS. 4A-12D, any layer of the structure 300 may have a film thereon which includes graphene ribbons and/or carbon nanotubes and/or is like any film according to the present invention described above.

Figure 8:
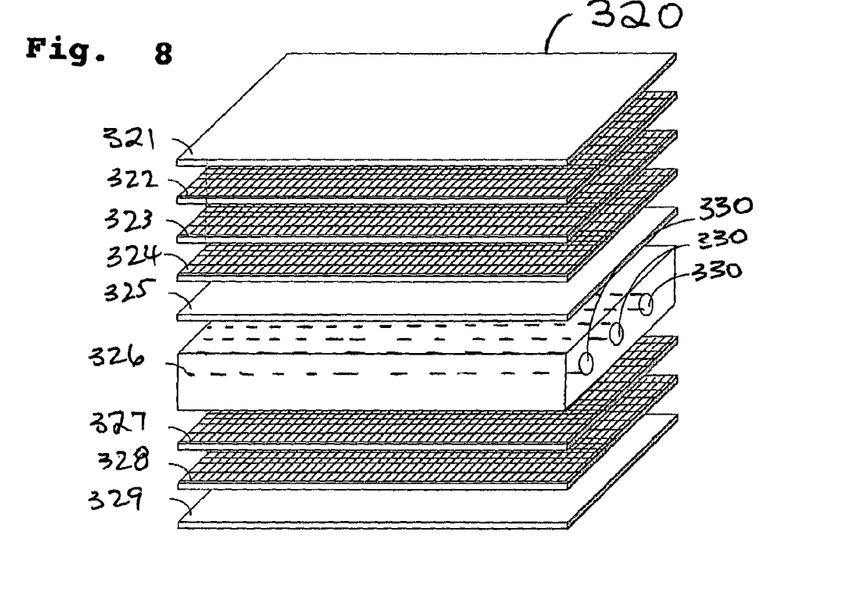
FIG. 8 is a perspective exploded view of armor according to the present invention.

The present invention provides new and nonobvious modular panels which are neither taught by nor suggested by U.S. application Ser. No. 12/189,684 filed Aug. 11, 2008 (incorporated fully herein for all purposes). This patent has no teaching or suggestion to use carbon nanotubes, graphene or ribbons according to the present invention as taught by the present invention. FIG. 8 shows a panel 320 according to the present invention with layers 321, 322, 323, 324, 325, 326, 327, 328 and 329, with adjacent layers connected to each other, e.g. with adhesive between layers. In one aspect, layers 322-324 and 327, 328 are woven layers, any one, two or all of which may be deleted according to the present invention; any one, two, three or all of which may be made of material that includes ceramic and ribbons according to the present invention; and any one, two, three or all of which may be any suitable backing according to the present invention or any suitable article according to the present invention as described above. In one aspect these layers 322-324, 327 and 328 are woven polypropylene with a thickness between 0.005 and 0.006 inches (e.g. 0.132 mm) and a weight of about 0.02 lbs. per square foot. In one aspect the polypropylene is coated (e.g. sprayed) with carbon nanotubes and/or with graphene ribbon-like material. In another aspect the woven material is a mixture of polypropylene and graphene ribbon-like material and/or carbon nanotubes. In one aspect the layers (or any of them) 322-324 and/or 327, 328 are any suitable backing according to the present invention or any suitable article according to the present invention as described above.

Layers 321, 325, and 329 are planar layers made, e.g., of: polyurethane film 0.010 to 0.015 inches thick; a film of polyurethane and graphene ribbon-like material; a film of polyurethane, ribbons and carbon nanotubes; or a film of polyurethane and carbon nanotubes. In one aspect the film is any suitable film according to the present invention described above. Any one, two or all the layers 321, 325, 329 may be deleted.

Layer 326, made of any suitable material of sufficient strength (including, but not limited to, materials as disclosed in U.S. application Ser. No. 12/189,684 or any of these materials with graphene ribbons) encapsulates rods 330. Optionally the rods are deleted. In one aspect the layer 326 is about an inch thick. In one aspect the rods 330 are about an inch in diameter. The rods may be made of any suitable material including, but not limited to, those disclosed in U.S. application Ser. No. 12/189,684 or these materials with graphene ribbon-like material and/or with carbon nanotubes as taught by the present invention.

In one aspect the layer 326 is any suitable backing according to the present invention or suitable article according to the present invention described above. In one aspect, the rods 330 are an article (of rod shape) as any such article according to the present invention as described above. Optionally the layer 326 is deleted.

Figure 9:
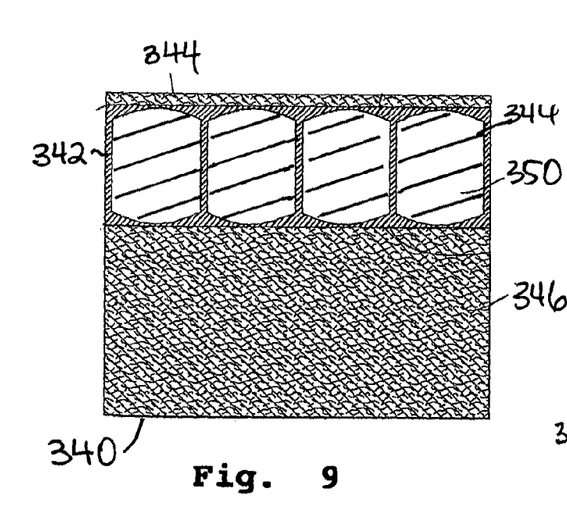
FIG. 9 is a cross-section view of armor according to the present invention.

The present invention provides new and nonobvious armor which is neither taught nor suggested by U.S. application Ser. No. 10/094,849 filed Mar. 4, 2002 (incorporated fully herein for all purposes). This patent has no teaching or suggestion to use carbon nanotubes, graphene or ribbons as taught by the present invention. FIG. 9 shows armor 340 according to the present invention with a core 342 having spaces 344 each containing one (or at least one) insert 350. Sheets 344, 346 (either or both of which may be deleted) are on sides of the core 342.

In certain aspects, each insert 350 is made of ceramic; ceramic with carbon nanotubes; ceramic with ribbons according to the present invention; or ceramic with ribbons according to the present invention and carbon nanotubes. In one aspect each insert 350 is a tile according to the present invention as any tile according to the present invention described above (or as in FIG. 12B), or an article according to the present invention as any such article described above.

In one aspect the core 342 is made of any material disclosed in U.S. application Ser. No. 10/094,849; any such material with carbon nanotubes; any such material with graphene ribbon-like material; or any such material with carbon nanotubes and ribbons according to the present invention. In one aspect the core 342 is a suitable article according to the present invention as any such article described above with the spaces 344. The spaces 344 may be any chosen shape to accommodate inserts 350 of any chosen shape, including, but not limited to, any shape as disclosed in FIGS. 2A-2Y, 4A, 7A and 8.

Sheets 344, 346 may be any sheet disclosed in U.S. application Ser. No. 10/094,849; any such sheet with carbon nanotubes; any such sheet with ribbons according to the present invention; or any such sheet with carbon nanotubes and ribbons according to the present invention. In certain aspects the sheets 344, 346 are any suitable backing according to the present invention or any suitable article according to the present invention disclosed above.

Figure 10:
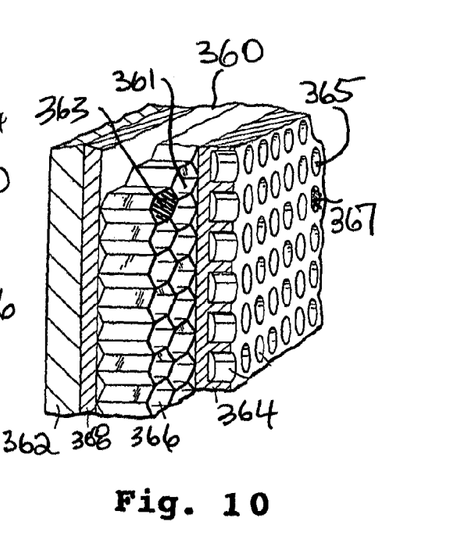
FIG. 10 is a perspective partially cross-sectional view of armor according to the present invention.

The present invention discloses new and nonobvious armor which is neither taught nor suggested by U.S. Pat. No. 5,221,807 (incorporated fully herein for all purposes). This patent has no teaching or suggestion to use carbon nanotubes, graphene or graphene ribbon-like material as taught by the present invention. FIG. 10 shows armor 360 according to the present invention has a plate 362, a plate 364, a layer 366 between the plates, and, optionally, a plate 368. Each of these plates and layers may be of material as described in U.S. Pat. No. 5,221,807; of such material with carbon nanotubes; of such material with ribbons according to the present invention; or of such material with carbon nanotubes and ribbons according to the present invention.

In certain aspects, the plates 362, the plate 364, and/or the plate 368 are any suitable backing according to the present invention or any suitable article according to the present invention described above. They may be solid or, as shown in FIG. 10, they may have a series of openings or spaces (as may any article according to the present invention described above). As is true for any embodiment of the present invention in which an item, layer, plate, backing or article has an opening, openings, a space, or spaces, each space 361 in the plate 366 may be filled with material 363 including ceramic and graphene ribbon-like material (one such space indicated with material 363 in FIG. 10) and each opening 365 in the plate 364 may be filled with material 367 including ceramic and graphene ribbon-like material (one such space indicated with material 367 in FIG. 10). The material 363 and/or the material 367 may be any suitable backing according to the present invention or any suitable article according to the present invention described above.

Figure 11:
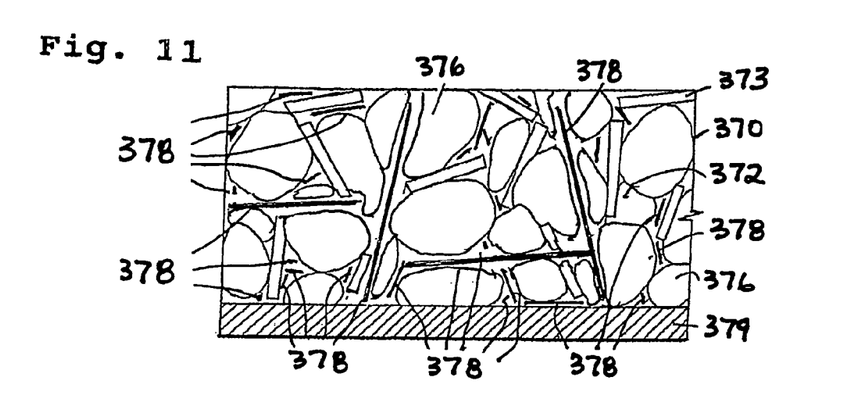
FIG. 11 is a cross-section view of armor according to the present invention.

The present invention provides new and nonobvious armor which is neither disclosed in nor suggested by U.S. Pat. No. 7,041,372 (incorporated fully herein for all purposes). This patent has no teaching or suggestion to use carbon nanotubes, graphene or graphene ribbon-like material as taught by the present invention. Armor 370 according to the present invention as shown in FIG. 11 has an optional substrate 379 and a matrix 372 on the substrate 379 (when the substrate 379 is present). The matrix 372 includes unit components 376 which may be, e.g., any suitable metal or ceramic, including, but not limited to, any suitable metal or ceramic disclosed in U.S. Pat. No. 7,041,372; ceramic with ribbons according to the present invention; or ceramic with ribbons according to the present invention and carbon nanotubes. The matrix 372 may be any suitable backing according to the present invention or any suitable article according to the present invention as described above.

The substrate 379 may be any substrate as disclosed in U.S. Pat. No. 7,041,372 or any suitable backing according to the present invention or any suitable article according to the present invention as described above.

As shown in FIG. 11 (not to scale), the matrix 372 has the units 376, optional carbon nanotubes 373, and ribbons 378.

Figures 12A, 12B, 12C:
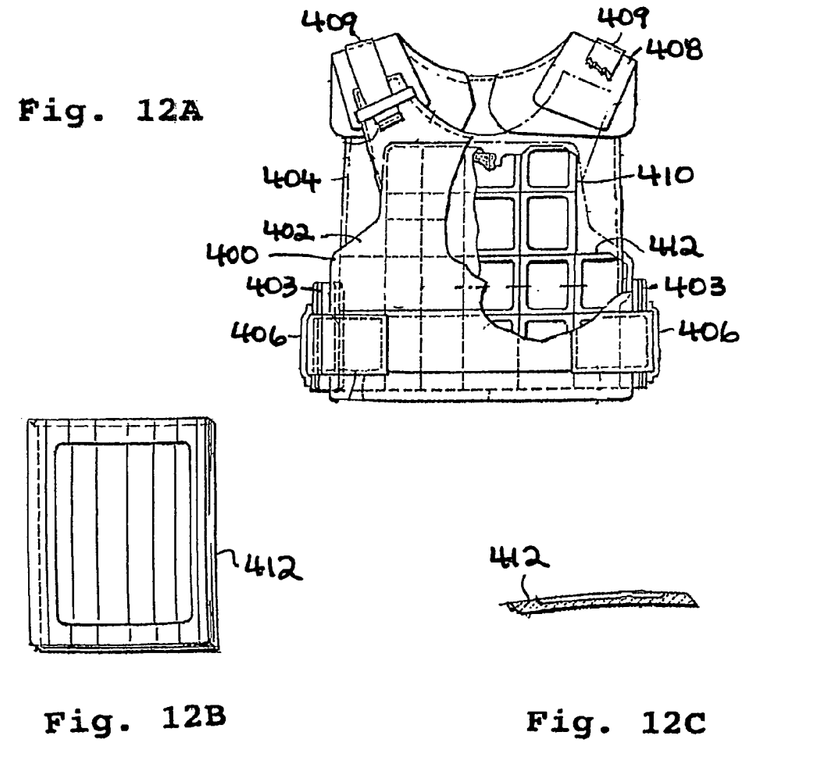
FIG. 12A is a front view of an armor vest according to the present invention.
FIG. 12B is a front view of a tile according to the present invention.
FIG. 12C is a cross-section view of material according to the present invention used to make a tile as in FIG. 12B.

The present invention provides new and nonobvious armored clothing neither disclosed in nor suggested by U.S. Pat. No. 5,996,115 (incorporated fully herein for all purposes). This patent has no teaching or suggestion to use carbon nanotubes, graphene or ribbons as taught by the present invention. FIG. 12A shows a vest 400 according to the present invention with a plurality of tiles 410, 412. The tiles 410, 412 may be any tile according to the present invention described above. Parts of the vest 400—front 402, rear 404, sides 406, top 408, straps 409—may be made of or contain, any suitable backing according to the present invention as described above. The sides 406 may include tiles 403 (as any tile according to the present invention).

It is within the scope of the present invention to add nanotubes, crushed or not, and/or ribbon-like material to ballistic fabric.

The present invention, therefore, provides in some, but not in necessarily all embodiments, methods for making an armor article, the methods including: producing processed ceramic material by processing ceramic material using a ceramic processing apparatus; producing processed nanotube material with a nanotube processing apparatus, the nanotube material being carbon nanotube material; introducing the processed ceramic material and the processed nanotube material into a mold forming a processed mixture of processed ceramic material with processed nanotube material; compressing the processed mixture in the mold with sufficient pressure to transform the processed nanotube material into transformed material, producing a compressed mixture; heating the compressed mixture to sinter together the processed ceramic material with transformed material therein, producing a sintered-together item; and the cooled sintered-together item being an armor article. Such a method may have one or some, in any possible combination, of the elements, features, steps, characteristics or aspects as claimed in the claims submitted herewith.

The present invention, therefore, provides in some, but not in necessarily all embodiments, a method for making an armor article, the method including: producing processed ceramic material by processing ceramic material using a ceramic processing apparatus; producing processed nanotube material with a nanotube processing apparatus, the nanotube material comprising carbon nanotube material; introducing the processed ceramic material and the processed nanotube material into a mold forming a processed mixture of processed ceramic material with processed nanotube material; compressing the processed mixture in the mold with sufficient pressure to transform the processed nanotube material into transformed material, producing a compressed mixture; heating the compressed mixture to sinter together the processed ceramic material with transformed material therein, producing a sintered-together item; cooling the sintered-together item producing an armor article; the ceramic material being alumina; the nanotube material being multi-walled nanotubes; the mixture of ceramic material and nanotube material in the mold between 0.1% to 1.0% by weight nanotube material; and the transformed material being graphene ribbon-like material.

The present invention, therefore, provides in some, but not in necessarily all embodiments, armor having ceramic material, the ceramic material having therein transformed nanotube material; and the transformed nanotube material produced by subjecting a matrix of the ceramic material and nanotube material to sufficient pressure and sufficient heat to transform the nanotube material. Such armor may have one or some, in any possible combination, of the elements, features, steps, characteristics or aspects as claimed in the claims submitted herewith.

The present invention, therefore, provides in some, but not in necessarily all embodiments, armor having a plurality of adjacent tiles; each tile including ceramic material, the ceramic material having therein transformed nanotube material, and the transformed nanotube material produced by subjecting a matrix of the ceramic material and nanotube material to sufficient pressure and sufficient heat to transform the nanotube material.

The present invention, therefore, provides in some, but not in necessarily all embodiments, armor having a plurality of stacked tiles; each tile including ceramic material, the ceramic material having therein transformed nanotube material, and the transformed nanotube material produced by subjecting a matrix of the ceramic material and nanotube material to sufficient pressure and sufficient heat to transform the nanotube material.

The present invention, therefore, provides in some, but not in necessarily all embodiments, armor structure including: a first layer; a second layer; and a third layer; at least one of the first layer, second layer and third layer being an armor including ceramic material, the ceramic material having therein transformed nanotube material, and the transformed nanotube material produced by subjecting a matrix of the ceramic material and nanotube material to sufficient pressure and sufficient heat to transform the nanotube material. Such an armor structure may have one or some, in any possible combination, of the elements, features, steps, characteristics or aspects as claimed in the claims submitted herewith.

The present invention, therefore, provides in some, but not in necessarily all embodiments, an armor article having ceramic material, the ceramic material having therein transformed nanotube material, and the transformed nanotube material produced by subjecting a matrix of the ceramic material and nanotube material to sufficient pressure and sufficient heat to transform the nanotube material, wherein the armor article is one of rod, tile, insert, plate, blade, key, nut, bolt, hook, gear, chain link, screw, bearing, drill bit, bit seal, mill, reamer, pipe, universal joint, pliers, tool, backing, disc, panel, cylinder, pyramid, sphere, cone, knife, bearing structure, bit body, mill body, reamer body, cutting blade, milling blade, reaming blade, cutter, cutting insert, valve body, valve member, valve seat, ball, pipe threaded area, and bit roller cone.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with the requirements of 35 U.S.C. §112. The inventors may rely on the Doctrine of Equivalents to determine and assess the scope of their invention and of the claims that follow as they may pertain to apparatus and/or methods not materially departing from, but outside of, the literal scope of the invention as set forth in the following claims. All patents and applications identified herein are incorporated fully herein for all purposes. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

What is claimed is:

1. Armor comprising
   ceramic material, the ceramic material having therein transformed nanotube material,
   the transformed nanotube material produced by subjecting a matrix of the ceramic material and nanotube material to sufficient pressure and sufficient heat to transform the nanotube material,
   at least one layer of ballistic fabric connected to the ceramic material,
   the at least one layer of ballistic fabric containing carbon nanotubes.

2. Armor comprising
   ceramic material, the ceramic material having therein transformed nanotube material,
   the transformed nanotube material produced by subjecting a matrix of the ceramic material and nanotube material to sufficient pressure and sufficient heat to transform the nanotube material,
   at least one layer of ballistic fabric connected to the ceramic material,
   the at least one layer of ballistic fabric containing graphene ribbon-like material.

3. Armor comprising
   ceramic material, the ceramic material having therein transformed nanotube material,
   the transformed nanotube material produced by subjecting a matrix of the ceramic material and nanotube material to sufficient pressure and sufficient heat to transform the nanotube material,
   multiple layers of ballistic fabric interleaved with amounts of the matrix,
   the ballistic fabric connected to the ceramic material with a binder,
   the binder containing carbon nanotubes.

4. Armor comprising
ceramic material, the ceramic material having therein transformed nanotube material,
the transformed nanotube material produced by subjecting a matrix of the ceramic material and nanotube material to sufficient pressure and sufficient heat to transform the nanotube material,
multiple layers of ballistic fabric interleaved with amounts of the matrix,
the ballistic fabric connected to the ceramic material with a binder,
the binder containing graphene ribbon-like material.

5. Armor comprising
ceramic material, the ceramic material having therein transformed nanotube material,
the transformed nanotube material produced by subjecting a matrix of the ceramic material and nanotube material to sufficient pressure and sufficient heat to transform the nanotube material,
multiple layers of ballistic fabric interleaved with amounts of the matrix, and layers of binder interleaved with the layers of ballistic fabric,
wherein each layer of binder is a film of buckypaper.

* * * * *